(12) United States Patent
Anderson et al.

(10) Patent No.: US 7,778,596 B2
(45) Date of Patent: Aug. 17, 2010

(54) AIRLINK SENSING WATERMARKING REPEATER

(75) Inventors: Jon James Anderson, Boulder, CO (US); Daniel James Willis, Lafayette, CO (US); Kenneth Robert Baker, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 952 days.

(21) Appl. No.: 10/903,808

(22) Filed: Jul. 29, 2004

(65) Prior Publication Data
US 2006/0030262 A1 Feb. 9, 2006

(51) Int. Cl.
*H04B 7/15* (2006.01)
(52) U.S. Cl. .......................... 455/11.1; 455/9; 455/13.1; 370/226; 370/243; 370/293; 370/279; 370/315
(58) Field of Classification Search ............ 455/9–11.1, 455/13.1, 16, 7, 13.4, 423; 370/226, 243, 370/246, 274, 279, 293, 315, 316, 492, 501
See application file for complete search history.

(56) References Cited

U.S. PATENT DOCUMENTS

| | | | |
|---|---|---|---|
| 3,670,249 A | 6/1972 | Meslener | |
| 4,723,320 A | 2/1988 | Horton | |
| 4,901,307 A | 2/1990 | Gilhousen et al. | |
| 4,993,021 A | 2/1991 | Nannicini et al. | |
| 5,056,109 A | 10/1991 | Gilhousen et al. | |
| 5,103,459 A | 4/1992 | Gilhousen et al. | |
| 5,210,632 A | 5/1993 | Murakami et al. | |
| 5,355,511 A | 10/1994 | Hatano et al. | |
| 5,383,219 A | 1/1995 | Wheatley, III et al. | |
| 5,396,516 A | 3/1995 | Padovani et al. | |
| 5,440,418 A | 8/1995 | Ishimura et al. | |
| 5,507,452 A | 4/1996 | Mayersak | |
| 5,608,393 A | 3/1997 | Hartman | |
| 5,626,630 A | 5/1997 | Markowitz et al. | |
| 5,646,630 A | 7/1997 | Sheynblat et al. | |
| 5,812,933 A | 9/1998 | Niki | |

(Continued)

FOREIGN PATENT DOCUMENTS

EP 0651360 3/1995

(Continued)

OTHER PUBLICATIONS

International Search Report, PCT/US2005/020091, International Searching Authority, European Patent Office, Jul. 9, 2005.

(Continued)

*Primary Examiner*—Duc Nguyen
*Assistant Examiner*—Dominic E Rego
(74) *Attorney, Agent, or Firm*—Jimmy Cheng (57) ABSTRACT

A wireless repeater configured for implementation in a wireless communication system is disclosed. The repeater can be configured to receive and rebroadcast communications using various types of airlinks in a wireless communication system. The wireless repeater can include a receiver configured to sense the type of airlink being supported by the repeater. The repeater can then selectively apply a repeater identifying watermark to a signal based on the type of airlink. The repeater may be configured to periodically scan an operating bandwidth for supported airlinks and can configure the watermarking applied to signals within the channels based on the detected airlinks.

35 Claims, 4 Drawing Sheets

U.S. PATENT DOCUMENTS

| | | | |
|---|---|---|---|
| 5,815,795 | A | 9/1998 | Iwai |
| 5,910,943 | A | 6/1999 | Wickman |
| 5,991,345 | A | 11/1999 | Ramasastry |
| 6,052,558 | A | 4/2000 | Cook et al. |
| 6,108,364 | A | 8/2000 | Weaver, Jr. et al. |
| 6,118,809 | A | 9/2000 | Lo |
| 6,147,981 | A | 11/2000 | Prescott |
| 6,185,429 | B1 | 2/2001 | Gehrke et al. |
| 6,188,719 | B1 | 2/2001 | Collomby |
| 6,266,008 | B1 | 7/2001 | Huston et al. |
| 6,272,316 | B1 | 8/2001 | Wiedeman et al. |
| 6,307,504 | B1 | 10/2001 | Sheynblat |
| 6,317,420 | B1 * | 11/2001 | Schiff .................. 370/325 |
| 6,346,911 | B1 | 2/2002 | King |
| 6,347,216 | B1 | 2/2002 | Marko et al. |
| 6,349,211 | B2 | 2/2002 | Koshima et al. |
| 6,377,792 | B1 | 4/2002 | Brown et al. |
| 6,404,775 | B1 * | 6/2002 | Leslie et al. .......... 370/466 |
| 6,415,155 | B1 | 7/2002 | Koshima et al. |
| 6,429,808 | B1 | 8/2002 | King et al. |
| 6,430,415 | B1 * | 8/2002 | Agashe et al. .......... 455/456.5 |
| 6,501,955 | B1 | 12/2002 | Durrant et al. |
| 6,507,741 | B1 | 1/2003 | Bassirat |
| 6,515,975 | B1 | 2/2003 | Chheda et al. |
| 6,615,021 | B1 | 9/2003 | Lovinggood et al. |
| 6,690,657 | B1 | 2/2004 | Lau et al. |
| 6,788,663 | B2 | 9/2004 | Rowitch |
| 6,889,033 | B2 | 5/2005 | Bongfeldt |
| 6,901,264 | B2 | 5/2005 | Myr |
| 6,901,268 | B2 | 5/2005 | Chang |
| 6,999,778 | B2 | 2/2006 | DiBuduo |
| 7,013,111 | B2 | 3/2006 | Kuwahara et al. |
| 7,020,436 | B2 | 3/2006 | Schmutz |
| 7,027,773 | B1 | 4/2006 | McMillin |
| 7,039,418 | B2 | 5/2006 | Amerga et al. |
| 7,058,400 | B2 | 6/2006 | Brooks |
| 7,062,224 | B2 | 6/2006 | Baker et al. |
| 7,068,973 | B1 | 6/2006 | Lovinggood et al. |
| 7,075,481 | B2 | 7/2006 | Huston et al. |
| 7,123,911 | B1 * | 10/2006 | Ngan .................. 455/435.2 |
| 7,139,580 | B2 | 11/2006 | Stein et al. |
| 7,218,275 | B2 | 5/2007 | Han |
| 7,355,993 | B2 | 4/2008 | Adkins et al. |
| 2002/0028655 | A1 | 3/2002 | Rosener et al. |
| 2002/0160813 | A1 * | 10/2002 | Miya .................. 455/562 |
| 2002/0167918 | A1 | 11/2002 | Brewer |
| 2003/0008663 | A1 | 1/2003 | Stein et al. |
| 2003/0023682 | A1 * | 1/2003 | Brown et al. ............. 709/204 |
| 2003/0039267 | A1 * | 2/2003 | Koo et al. ............... 370/465 |
| 2003/0076979 | A1 * | 4/2003 | Matsui ................ 382/100 |
| 2003/0083008 | A1 | 5/2003 | Baker et al. |
| 2003/0086401 | A1 * | 5/2003 | Lee et al. .............. 370/337 |
| 2003/0123401 | A1 * | 7/2003 | Dean .................. 370/318 |
| 2003/0125045 | A1 | 7/2003 | Riley et al. |
| 2003/0151506 | A1 | 8/2003 | Luccketti |
| 2003/0193992 | A1 * | 10/2003 | Challa et al. ............. 375/147 |
| 2004/0006696 | A1 * | 1/2004 | Shin et al. ............... 713/176 |
| 2004/0028003 | A1 * | 2/2004 | Diener et al. ............. 370/319 |
| 2004/0073916 | A1 * | 4/2004 | Petrovic et al. ............ 725/18 |
| 2004/0097190 | A1 | 5/2004 | Durrant et al. |
| 2004/0176026 | A1 | 9/2004 | Gainey et al. |
| 2006/0046642 | A1 * | 3/2006 | Bassiri et al. ............. 455/7 |
| 2007/0052560 | A1 * | 3/2007 | Van Der Veen et al. ....... 341/51 |

FOREIGN PATENT DOCUMENTS

| | | |
|---|---|---|
| EP | 0822674 | 2/1998 |
| EP | 0840533 | 5/1998 |
| EP | 0851695 | 7/1998 |
| EP | 0588598 | 1/1999 |
| EP | 0924878 | 6/1999 |
| EP | 0935356 | 8/1999 |
| EP | 1093273 | 4/2001 |
| EP | 1207404 | 5/2002 |
| GB | 2378614 | 2/2003 |
| JP | 04-095791 | 3/1992 |
| JP | 2001-209891 | 8/2001 |
| JP | 2006-512874 | 4/2006 |
| KR | 20030082363 | 10/2003 |
| KR | 2003-0088511 | 11/2003 |
| WO | 9613103 | 5/1996 |
| WO | 9706648 | 2/1997 |
| WO | 9732445 | 9/1997 |
| WO | 9927747 | 6/1999 |
| WO | 0064091 | 10/2000 |
| WO | 0133302 | 5/2001 |
| WO | 0150635 | 7/2001 |
| WO | 0199444 | 12/2001 |
| WO | 0217669 | 2/2002 |
| WO | 0233996 | 4/2002 |
| WO | 02059638 | 8/2002 |
| WO | 02087275 | 10/2002 |
| WO | 03036824 | 5/2003 |
| WO | 03044970 | 5/2003 |
| WO | 03061202 | 7/2003 |
| WO | 03093859 | 11/2003 |
| WO | 2004095733 | 11/2004 |

OTHER PUBLICATIONS

Written Opinion, PCT/US2005/020091, International Searching Authority, European Patent Office, Jul. 9, 2005.

International Preliminary Report on Patentability, PCT/US2005/020091, The International Bureau of WIPO, Geneva, Switzerland, Jan. 30, 2007.

Bavafa, et al., Repeaters for CDMA Systems, 48th IEEE Vehicular Technology Conference, 1998, VTC 98, May 18-21, 1998, vol. 2, pp. 1161-1165.

Simon, et al., "Spread Spectrum Communications Handbook," Revised Edition, McGraw-Hill, 1994, ISBN 0-07-057629-7, pp. 11-12.

Telecommunications Industry Association, "Recommended Minimum Performance Standards for Dual-Mode Wideband Spread Spectrum Cellular Moblie Stations," TIA/EIA/IS-98-A, Jul. 1996.

* cited by examiner

AIRLINK SENSING WATERMARKING REPEATER

BACKGROUND OF THE DISCLOSURE

Wireless repeaters are commonly used in communication systems to extend the range of a communication system or to provide accessibility to coverage holes within the communication system. The repeater can be configured to receive a transmission at a first frequency and retransmit the transmission at a second frequency. In some embodiments, the repeater can be a single frequency repeater and retransmit signals at the same frequency as the received signal.

The repeater can be configured as a bidirectional repeater. The repeater may receive signals from a local region and retransmit them to a remote receiver in a remote region. The repeater may also receive transmissions from the remote region and retransmit them to a receiver in the local region. The bidirectional repeater may be transparent to a wireless communication transceiver operating in the remote region. That is, the wireless transceiver operating in the remote region may operate in the same manner as if it were communicating directly with a device in the local region, and may not be aware that it is communicating through a repeater.

For some communication systems, the lack of an awareness that a communication link is operating through a repeater does not pose any communication issues. However, in other communication systems, it can be advantageous for a communication device to be aware of the use of a repeater in a communication link.

A Time Division Multiple Access (TDMA) communication system, such as a Global System for Mobile communications (GSM) wireless communication system, active communication devices are allocated receive time slots in which they can expect to receive communications from a base station. Additionally, the communication devices may be assigned a transmit time slot that is relative to the timing of the receive slot. Typically, a communication device can transmit a signal slightly before the assigned transmit time slot to compensate for a propagation delay from the communication device to a receiving base station. However, a communication link that includes a repeater can have additional delays, including the propagation delay from the communication device to the repeater and the delay through the repeater.

Wireless communication systems may also incorporate position location applications. The position location applications can operate based in part on a time of arrival of one or more communication signals. For example, a wireless communication system, such as a GSM system, a Code Division Multiple Access (CDMA) communication system, or a Universal Mobile Telecommunication System (UMTS) that can be based on a GSM system or a CDMA system, can incorporate a position location system where a mobile station can determine its location based in part on a time of arrival of signals from multiple base stations.

If the base station transmission is relayed through a repeater, the mobile station may not be able to determine an accurate time of arrival of the repeated signal. The repeater contributes to a signal delay. Additionally, the aggregate propagation delay from the base station to the repeater and then to the mobile station may not accurately reflect a propagation delay of a signal traveling from the base station directly to the mobile station. Therefore, including the repeater in the communication link creates an inaccuracy in the position location system.

Some communication systems reduce the inaccuracy in a position location system having repeaters by identifying the repeaters as a signal source when the repeater is included as part of the communication link. The repeater can be identified as a signal source, for example by applying a watermark to the signals relayed by the repeater.

The repeater can be configured, for example, to modulate the signals that are relayed. The type of modulation and modulation signal applied by the repeater can identify the particular repeater as the signal source. For example, the repeater can watermark a signal by frequency modulating the signals that are relayed by the repeater. The FM signature used to modulate the signals can identify the particular repeater. In other embodiments, the repeater can be configured to watermark the repeated signals by applying an Amplitude Modulation (AM), Phase Modulation (PM), differential delay modulation, or some other type of modulation to the repeated signals.

Therefore, to extend the range or to provide improved coverage within a wireless communication system, a system operator can selectively add wireless repeaters. The system operator can also configure each repeater to watermark the signals that are repeated to identify the presence and identity of the repeater in the communication link.

BRIEF SUMMARY OF THE DISCLOSURE

A wireless repeater configured for implementation in a wireless communication system is disclosed. The repeater can be configured to receive and rebroadcast communications using various types of airlinks in a wireless communication system. The wireless repeater can include a receiver configured to sense the type of airlink being supported by the repeater. The repeater can then selectively apply a repeater identifying watermark to a signal based on the type of airlink. The repeater may be configured to periodically scan an operating bandwidth for supported airlinks and can configure the watermarking applied to signals within the channels based on the detected airlinks.

The disclosure includes a wireless repeater having a watermarking module configured to selectively apply a watermark to at least one channel in a repeater operating band based in part on a control signal, and a receiver configured to receive a wireless transmission, determine an airlink corresponding to at least a portion of the wireless transmission, and generate the control signal based in part on the airlink.

The disclosure also includes a wireless repeater having a watermarking module configured to selectively apply a watermark to a forward link channel in a repeater operating band based in part on a control signal, and a receiver configured to receive a plurality of forward link channels including the forward link channel in the repeater operating band, determine an airlink corresponding to the forward link channel in part by demodulating a pilot channel within the forward link channel, and generate the control signal to selectively enable or disable the watermarking module based in part on the airlink.

The disclosure also includes a method of watermarking a wireless communication, including determining an airlink in a channel of an operating band of a repeater, and selectively applying a watermark to the channel based at least in part on the airlink.

The disclosure further includes a wireless repeater including means for determining an airlink in a channel of an operating band of a repeater, and means for selectively applying a watermark to the channel based at least in part on the airlink.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

A wireless repeater configured to watermark the repeated signals can facilitate the identification of the repeater as a signal source. However, the various types of watermarking can have different effects on the repeated signals, depending on the particular watermarking implementation and characteristics of the signals being relayed by the repeater. Some watermarking techniques can have detrimental effects on some signal types. For example, an FM watermarking configuration may have adverse effects on GSM or certain types of CDMA signals. FM watermarking these types of signals in a repeater may result in a degradation in the signal quality or degradation in the ability of a receiver to demodulate or otherwise recover the underlying data.

A wireless communication system such as a CDMA wireless communication system may be upgraded from its original configuration to incorporate system improvements, which may include additional communication protocols. For example, a CDMA wireless communication system may originally be configured to support communications in accordance with Telecommunications Industry Association/Electronic Industries Alliance (TIA/EIA) IS-95. The communication system may migrate to versions of the CDMA2000 standard. Thus, the communication system may, at times, support 1x EV-DO, 1X EV-DV, or CDMA2000 3x communications or some combination of the various CDMA communication technologies.

A repeater originally configured to watermark IS-95 CDMA communications may continue to support CDMA communications such as 1x EV-DO, 1X EV-DV, or CDMA2000 3x as the communication system evolves to support improved technology. However, the watermarking that is performed in the repeater, as originally configured, may have adverse effects on certain types of the CDMA communication. For example, FM watermarking may have an adverse effect on 1x EV-DO links, such that the performance of the communication link is degraded by approximately 1 dB or more. In other instances, based on the type of watermark and the signal characteristics, application of a watermark can result in 3 dB or more degradation in a communication link.

In one embodiment, the system operator may physically reconfigure the repeater as the system rolls out support for each new technology. A system technician may reconfigure each of the repeaters for a watermarking technique having reduced effects on the type of communication relayed by the repeater. In some instances, the technician may reconfigure the repeater to omit the watermarking process. In such embodiments, the system operator may, for example, prefer a position location ambiguity over degraded system performance.

The repeater embodiments described in the present disclosure allow a repeater to be configured for different airlinks. The repeater can include a receiver that is configured to receive the signals that are to be relayed by the repeater and sense the communication protocols present in the one or more channels of the repeater. The repeater can then configure a watermarking module to provide a watermarking implementation based on the sensed airlink that minimizes or eliminates signal degradation in the repeated signal. The watermarking module can provide one of a plurality of watermarking implementations. The plurality of watermarking implementations can include an implementation that omits any watermarking.

Figure 1A:
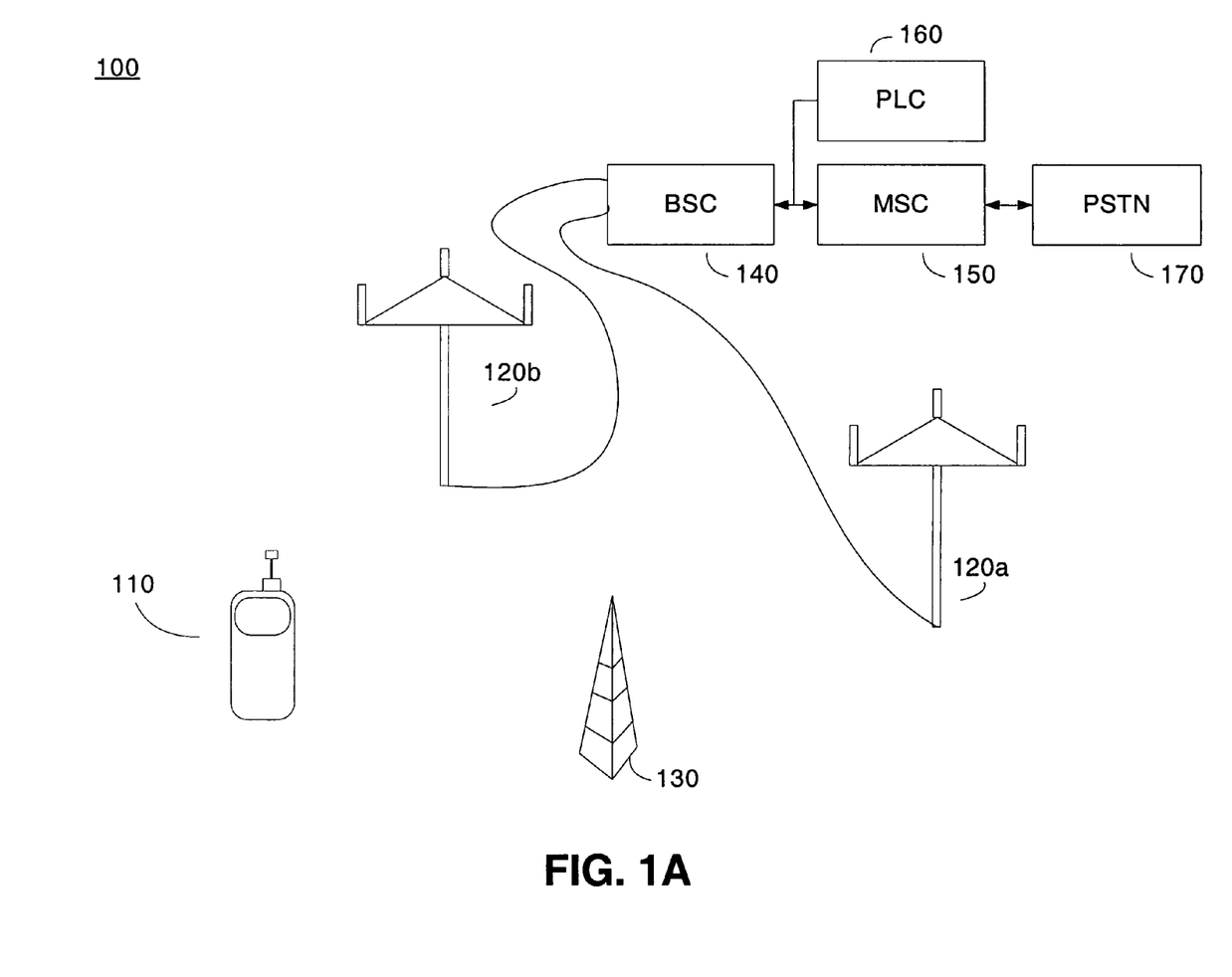
FIG. 1A is a functional block diagram of an embodiment of a wireless communication system having an airlink sensing watermarking repeater.

FIG. 1A is a functional block diagram of an embodiment of a wireless communication system 100 having an airlink sensing watermarking repeater 130. The system includes one or more fixed elements that can be in communication with a mobile station 110. The mobile station 110 can be, for example, a wireless telephone configured to operate according to one or more communication standards. The one or more communication standards can include, for example, GSM, WCDMA, and CDMA2000 including 1x EV-DO, 1X EV-DV, and CDMA2000 3x . The mobile station 110 can be a portable unit, a mobile unit, or, despite the nomenclature, a stationary unit. The mobile station 110 may also be referred to as a mobile unit, a mobile terminal, a user terminal, user equipment, a portable, a phone, and the like.

The mobile station 110 typically communicates with one or more base stations 120a or 120b, here depicted as sectored cellular towers. The mobile station 110 will typically communicate with the base station, for example 120b, that provides the strongest signal strength at a receiver within the mobile station 110.

The communication system 100 can include a repeater 130 to extend the coverage area of a base station, for example 120a. The repeater 130 can be a wireless repeater that is configured to sense the airlink used by the signals from the base station 120a. The repeater 130 can then adjust a watermark implementation based in part on the sensed airlink. The repeater 130 can periodically sense the airlink and modify the watermark implementation.

Each of the base stations 120a and 120b can be coupled to a Base Station Controller (BSC) 140 that routes the communication signals to and from the appropriate base stations 120a and 120b. The BSC 140 is coupled to a Mobile Switching Center (MSC) 150 that can be configured to operate as an interface between the mobile station 110 and a Public Switched Telephone Network (PSTN) 170. Therefore, the MSC 150 is also coupled to the PSTN 170. The MSC 150 can also be configured to coordinate inter-system handoffs with other communication systems.

A Position Location System (PLS) 160 can also be coupled to the BSC 140. The PLS 160 can be configured, for example, to store position location information, such as the location of each of the base stations 120a and 120b and repeater 130 in the communication system 100. In one embodiment, the PLS 160 can be configured to provide the information to the mobile station 110 such that the mobile station 110 can determine its location based in part on pseudo ranges to multiple signal sources. In another embodiment, the PLS 160 can be configured to determine the location of the mobile station 110 based on pseudo range information provided by the mobile station 110. In the latter embodiment, a network server (not shown) in the PLS 160 can perform the position location determination in order to offload processing from the mobile station 110.

Figure 1B:
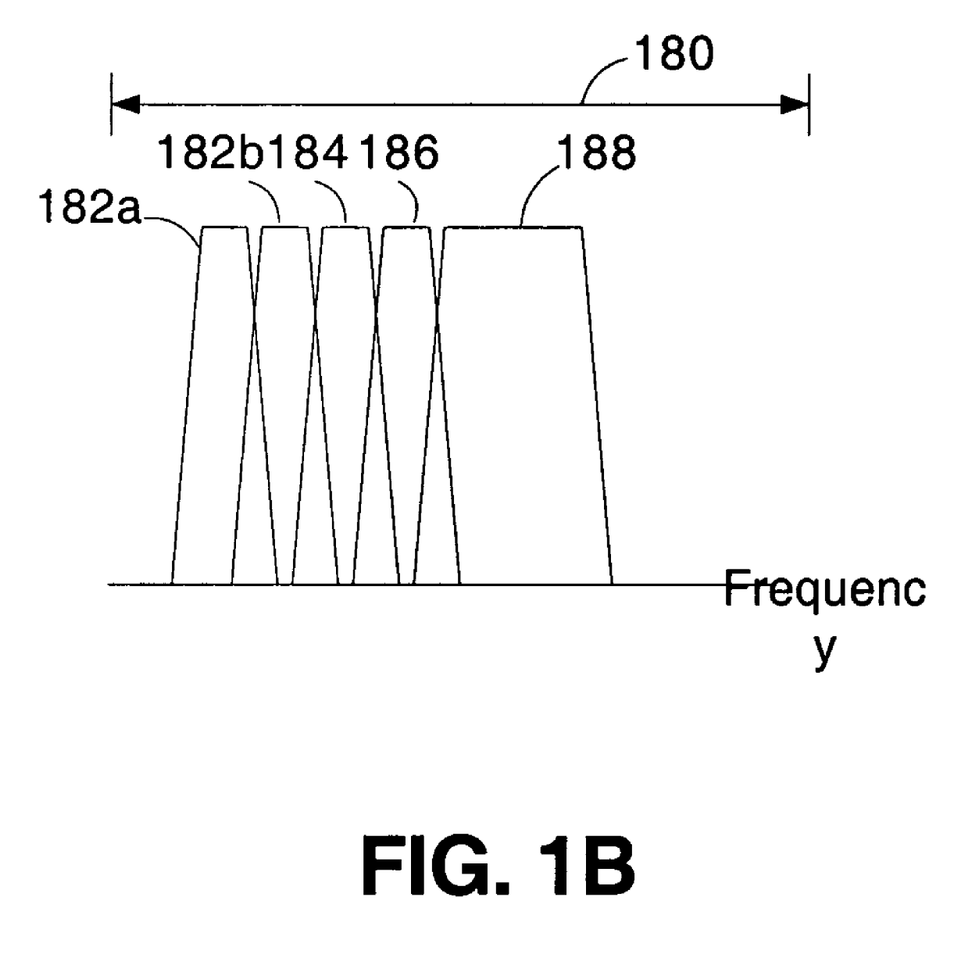
FIG. 1B is an example of a spectrum diagram of the wireless communication system shown in FIG. 1A.

FIG. 1B is an example of a spectrum diagram of the wireless communication system shown in FIG. 1A. The spectrum diagram depicts an example of a portion of an operating band 180 of the communication system. The operating band 180 can include a number of channels and the channels may be configured for different types of communications. The operating band 180 may be contiguous or may have multiple discrete segments.

Typically, the entire operating band 180 is configured to support a single communication standard. However, the airlink sensing watermarking repeater is not limited to configurations where the entire operating band 180 is configured for channels with the same communication standard.

The example of the spectrum of the operating band 180 includes five different channels configured for operation according to a version of a CDMA wireless communication standard. Four of the channels, 182*a-b*, 184, and 186 are configured as communication channels supporting 1x CDMA standards. For example, first and second channels 182*a* and 182*b* can be configured to support communications according to the IS-95 communication standard. A third channel 184 can be configured to support the 1x EV-DO communication standard. A fourth channel 186 can be configured to support the 1x EV-DV communication standard. The fifth channel 188 can be configured as a CDMA2000 3x communication channel and can use approximately three times the bandwidth used by the other channels.

The spectrum demonstrates a possible communication system evolution from supporting the IS-95 standard to supporting the 3x CDMA2000 standard. A wireless communication system may originally be configured to support IS-95 compliant communications. The wireless communication system may implement a variety of base stations and repeaters designed to provide communication support for a coverage area. The repeaters may initially be configured to watermark the signals that are relayed by the repeater in order to identify the repeater as the source of the signal.

The system may then migrate to support 1x EV-DO compliant communications on some or all of the channels. The watermarking performed by the repeaters in their original configuration may have adverse effects on the 1x EV-DO signals. For example, an FM watermarking technique may result in approximately a 1 dB degradation in the signal compared to a signal without an FM watermark. The airlink sensing repeater can sense a change in the airlink and can modify the type of watermarking based in part on the sensed airlinks.

For example, the repeater can be configured to apply watermarking based on a predetermined look up table listing possible airlinks and the appropriate watermark. For example, a repeater sensing a 1x EV-DO airlink may apply differential delay watermarking or may omit watermarking.

The wireless communication system may evolve to support 1x EV-DV communications in addition to or in place of previously supported communications. The airlink sensing repeater can then apply a watermark associated with the airlink. Similarly, as the wireless communication system evolves to support 3x CDMA2000 communications, the airlink sensing repeater may implement yet another watermark.

In the embodiment shown in FIG. 1B, the repeater may support multiple airlinks simultaneously and may be configured to implement watermarking on a channel by channel basis. In other embodiments, the repeater may be configured to implement watermarking on a band basis and may implement a watermarking technique that contributes a minimal degradation to any particular channel in the band. In such an embodiment, the repeater may be configured to either apply a particular watermarking implementation or omit watermarking of the relayed signals.

Figure 2:
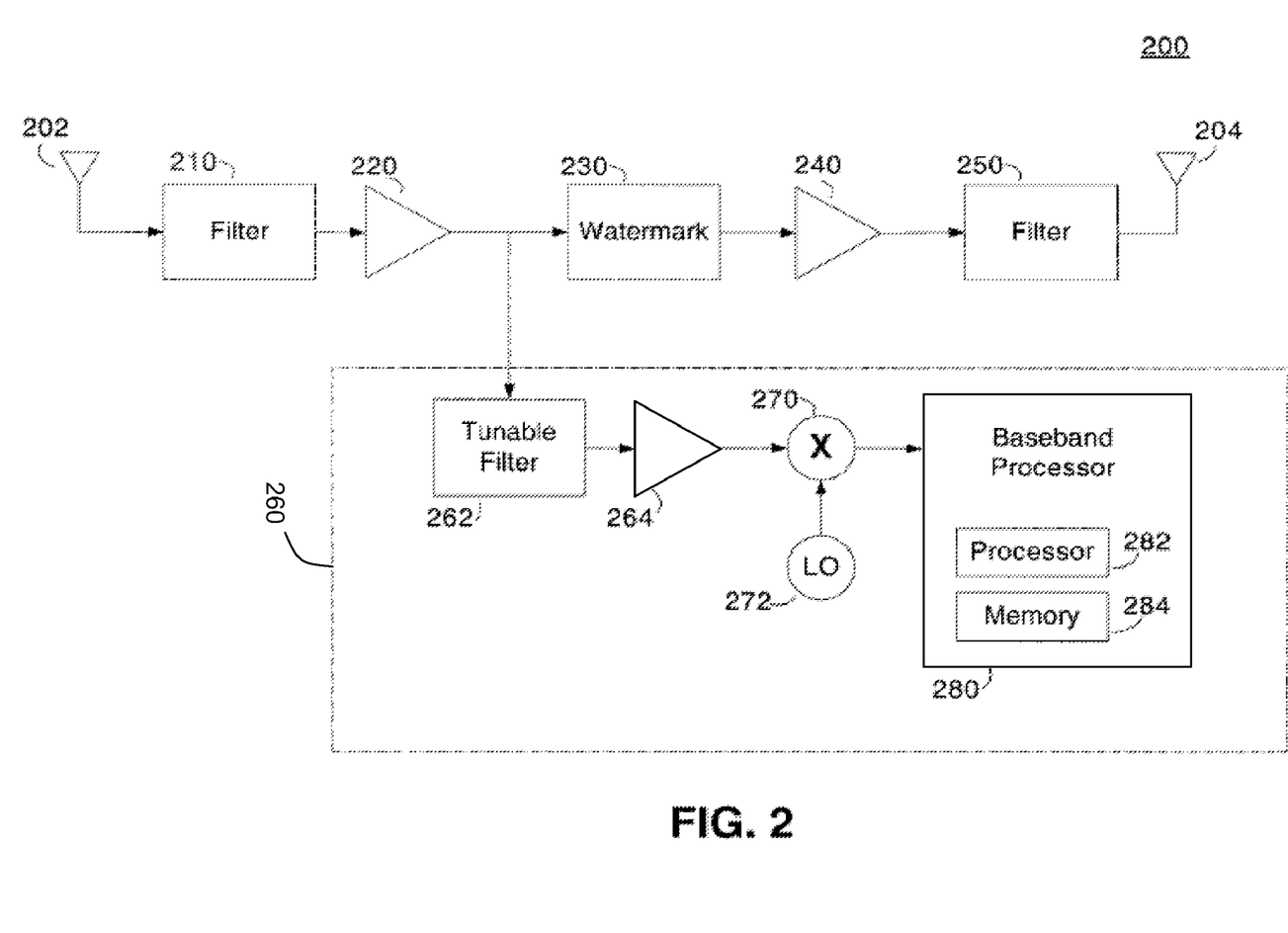
FIG. 2 is a functional block diagram of an embodiment of an airlink sensing watermarking repeater.

FIG. 2 is a functional block diagram of a forward link portion of an airlink sensing watermarking repeater 200, referred to simply as a repeater 200 for the sake of brevity. The repeater can be implemented as, for example, the repeater 130 shown in the communication system 100 of FIG. 1A. The repeater 200 is typically configured to repeat the forward link path from a base station to a mobile station, as well as the reverse link from the mobile station to the base station. However, there may not be sufficient advantages to watermarking the reverse link signals, and a repeater may be configured to relay the reverse link signals without watermarking. Thus, for the sake of clarity, FIG. 2 shows an embodiment of a forward link repeater and omits the elements of a corresponding reverse link repeater, which may or may not also include airlink sensing watermarking.

The repeater 200 embodiment shown in FIG. 2 is configured as a single frequency repeater. However, the repeater 200 is not limited to a single frequency repeater embodiment and can also be implemented as a frequency converting repeater. Thus, the repeater 200 can be configured to perform one or more frequency conversions, even in the condition where the output frequency is the same as the input frequency.

The repeater 200 includes a first antenna 202 configured to receive signals from a base station. The first antenna 202 is coupled to a filter 210 that can operate to attenuate signals that lie outside the operating bandwidth of the repeater 200. The output of the filter 220 can be coupled to a first amplifier 220 configured to amplify the signals in preparation of transmitting the signals to a coverage area of the repeater.

The output of the first amplifier 220 can be coupled to a watermarking module 230 that is configured to watermark the signal in a manner that can identify the particular repeater 200. In one embodiment, the watermarking module 230 can be configured to FM modulate the signal using a slowly varying data signal that identifies the repeater 200. In other embodiments, the watermarking module 230 can be configured to watermark the signal by applying a modulation such as Amplitude Modulation (AM), Frequency Modulation (FM), Phase Modulation (PM), or differential delay modulation. Watermarking module 230 can also be configured to omit watermarking of one or more channels.

The output of the watermarking module 230 can be coupled to a second amplifier 240 that is configured to amplify the signal to a transmit power level. The second amplifier 240 can be, for example, a high power amplifier. The output of the second amplifier 240 can be coupled to an output filter 250 that can be configured to attenuate frequency components outside the operating band of the repeater 200.

The output of the output filter 250 can be coupled to a second antenna 204 configured to broadcast the signal to a repeater coverage area. Typically, the second antenna 204 is isolated from the first antenna 202 by an amount sufficient to prevent amplification of a feedback signal.

The output of the first amplifier 220 can also be coupled to an airlink sensing receiver 260. the airlink sensing receiver 260 can be configured to determine the airlink in one or more channels of the operating band of the repeater 200. The output of the airlink sensing receiver 260 can be coupled to the watermarking module 230. The watermarking module 230 can be configured to apply watermarking based on the control signal from the output of the airlink sensing receiver 260.

The airlink sensing receiver 260 shown in the embodiment of FIG. 2 shares some of the front end receiver components with the repeater 200. In other embodiments, the airlink sensing receiver 260 may be distinct from the repeater signal path. For example, the airlink sensing receiver 260 can include an antenna and RF front end that is distinct from any of the components in the repeater signal path.

The airlink sensing receiver 260 includes a filter 262 that is configured to filter at least one channel from the received signals in the operating band of the repeater 200. In one embodiment, the filter 262 can be a tunable filter having a center frequency that can be selectively tuned to the center frequency of at least one channel in the operating band. The tunable filter may also have a variable bandwidth. The variable bandwidth can allow the airlink sensing receiver 260 to tune the center frequency and bandwidth of the filter 262 to match that of a channel within the operating band. The characteristics of the filter 262 can be tuned to match the characteristics of several different signals. For example, the airlink sensing receiver 260 can configure the filter 262 for a first channel having a first bandwidth, such as an IS-95 compliant CDMA signal having a bandwidth of approximately 1.23 MHz. Subsequently, the airlink sensing receiver 260 can configure the filter 262 for a second center frequency and a second bandwidth. For example, the airlink sensing receiver 260 can configure the filter 262 for a channel configured to carry a 3x CDMA2000 signal.

The output of the filter 262 can be coupled to an amplifier 264. The output of the amplifier 264 can be coupled to an input of a mixer 270. The Local Oscillator (LO) port of the mixer 270 can be driven by an output from a LO 272. The LO 272 can be a tunable LO that is tuned, for example, to a frequency that is used to frequency convert the signal at the input of the mixer 270 to a baseband signal. Alternatively, the mixer 270 can frequency convert the signal to a low Intermediate Frequency (IF) signal that can interface with a baseband processor 280.

The output of the mixer 270 can be coupled to a baseband processor 280 having a processor 282 in communication with memory 284. The baseband processor 280 can be configured to determine an airlink being used in a particular channel. In one embodiment, the baseband processor 280 can be configured to demodulate a signal present in the baseband signal. The baseband processor 280 can be configured, for example, to demodulate a pilot signal or a sync channel signal within the baseband signal. The baseband processor 280, and thereby the airlink sensing receiver 260, can then determine the airlink used in the channel.

In an embodiment, the baseband processor 280 can be configured, for example, to demodulate the pilot channel in wireless communication systems implementing CDMA communications. If the baseband processor 280 can successfully demodulate a pilot signal using an IS-95 short code, the baseband processor can determine that the airlink is an IS-95 compliant CDMA air interface. If the airlink is other than the IS-95 air interface, the baseband processor 280 will not be able to recover a pilot signal using an IS-95 short code.

The baseband processor 280 can attempt another demodulation technique to determine the airlink. For example, the baseband processor 280 can be configured to demodulate a UMTS primary scrambling code. The baseband processor 280 can determine a UMTS airlink if it can successfully demodulate the UMTS scrambling code.

The baseband processor 280, in one embodiment, can thus be configured to determine the airlink in a communication channel by demodulating a signal within the channel. The baseband processor 280 can, for example, attempt to demodulate a signal in the channel using one of a predetermined number of demodulation configurations. The baseband processor 280 can continue to attempt to demodulate a signal until a signal is recovered, or the predetermined number of demodulation configurations is exhausted.

In another embodiment, the airlink sensing receiver 260 can be configured to demodulate a predetermined overhead channel. The predetermined overhead channel can be, for example, a paging channel. The predetermined overhead channel can contain information regarding the airlink configurations within the repeater 200 operating band.

In still another embodiment, the airlink sensing receiver 260 can be configured to identify an airlink using successive demodulation configurations as described above. Once the airlink sensing receiver 260 has determined an airlink, the airlink sensing receiver 260 can be configured to demodulate an overhead channel within the identified airlink. The overhead channel can include the airlink configuration for the operating band of the repeater 200.

In yet another embodiment, a channel within the operating band may be dedicated to a particular airlink and the airlink sensing receiver 260 can be configured to demodulate a channel and determine the airlink configuration for the operating band.

The memory 284 within the baseband processor 280 can store one or more processor readable instructions as software that can be executed by the processor 282. The software executed by the processor 282 can configure the airlink sensing receiver 260. Thus, the software may be updated to allow the airlink sensing receiver 260 to demodulate and identify airlinks that may not have been standardized or supported at the time the repeater 200 was initially provisioned.

The airlink sensing receiver 260 can output a control signal or message that reconfigures the watermarking module 230 to apply watermarking based on the airlinks sensed by the airlink sensing receiver 260.

Figure 3:
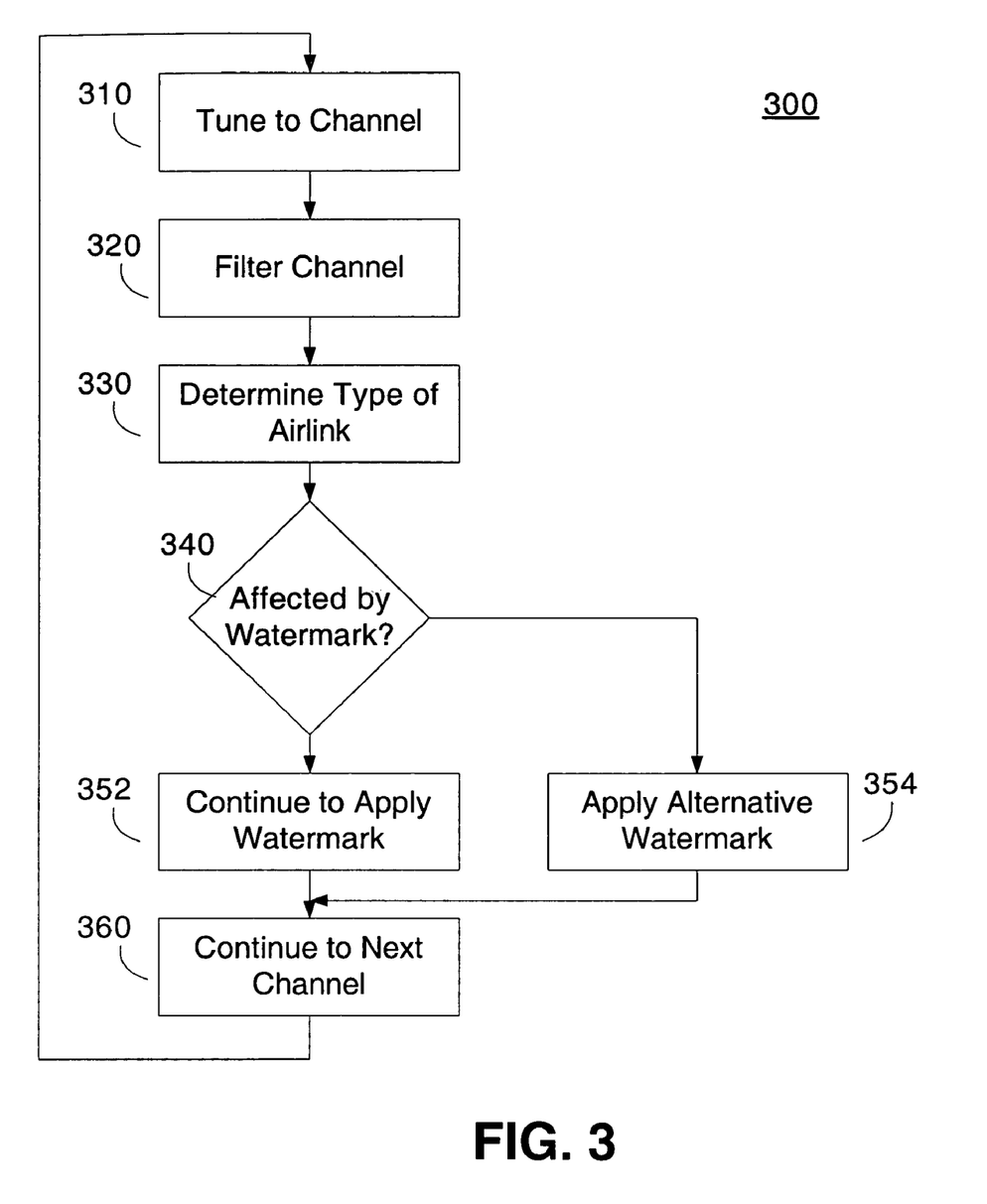
FIG. 3 is a flowchart of an embodiment of a process that may be performed by an airlink sensing watermarking repeater.

FIG. 3 is a flowchart of an airlink sensing and watermarking process 300 that can be performed by the repeater 130 of FIG. 1A or the repeater 200 of FIG. 2. The repeater can perform the process 300 periodically or can perform the process 300 in a continual loop. Where the repeater is configured to perform the process periodically, the repeater can be configured to perform the process, for example, on a daily, weekly, or monthly basis or some other time frame.

The repeater can be configured to implement the airlink sensing and watermarking process on a forward link, a reverse link or both the forward and reverse links. In embodiments where both the forward and reverse links are watermarked by the repeater, the repeater may sense the airlink in one direction and apply an appropriate watermark to a corresponding channel in the opposite direction. For example, a repeater may sense an airlink in a forward link channel and determine a watermark to be applied in the forward link as well as a watermark to be applied in a corresponding reverse link channel.

The process 300 begins with the repeater tuning a receiver to a channel within an operating band 310. An airlink sensing receiver within the repeater may tune, for example, a LO frequency to correspond to the channel.

The repeater can then filter the channel 320, for example, using a tunable filter. The tunable filter can be configured to have center frequency and a passband corresponding to one or more channels. For example, in a CDMA communication system a tunable filter can be tuned to a channel and can have a passband corresponding to a 1x or a 3x channel bandwidth.

The repeater using, for example, an airlink sensing receiver can determine the type of airlink used in the channel 330. After determining the type of airlink, the repeater determines if the airlink is affected by the current watermarking being applied to the channel 340. In one embodiment, the repeater may store a list of airlink types in memory and may also store a corresponding lists of acceptable watermarking types for each of the airlink types. Each of the lists of acceptable watermarks may be arranged, for example, according to a hierarchy of preferred watermark types. Additionally, the repeater may track the watermarks currently being applied to signals. Therefore, in an embodiment of the decision process, the repeater may determine if a watermark is acceptable for the previously determined airlink by examining the list of acceptable watermarks associated with the airlink type. The repeater can then direct the process flow to select the optimal watermark for the airlink. The repeater may select the optimal watermark, for example, based on a watermark currently being used or on the list of acceptable watermarks for the type of airlink.

If the repeater determines that the airlink is not affected by the watermark, the repeater continues to apply the existing watermarking to the channel 352. However, if the repeater determines that the airlink is one that is adversely affected by the present watermark that is being applied to the channel, the repeater applies an alternative watermark to the channel 354. The alternative watermark can be selected from a predetermined list of available watermarks, including omitting the watermark. In some embodiments, the alternative watermark can be determined based on a predetermined look up table. In other embodiments, the alternative embodiment may be a predetermined watermark configuration. In other embodiments, the repeater omits the watermark for any airlink that is affected by a watermark.

Once the repeater determines and configures the appropriate watermark for the channel, the repeater advances to the next channel 360 in the operating band that is to be examined. The next channel may be contiguous with the previously examined channel or may be in a frequency band that is distinct from the frequency band of the previously examined channel. Then repeats the process 300 beginning with tuning to the desired channel 310.

In some repeater embodiments, the repeater may be configured to support a single contiguous operating band and all of the channels within the operating band may be configured for the same airlink. In such a system configuration, the repeater may be configured to sense the type of airlink in any one of the channels within the operating band and may apply the watermarking based on the airlink determined in the one channel.

In other embodiments, the repeater may be configured to support an operating band that includes multiple bands that may be contiguous or distinct. Each of the multiple bands may be configured to support a single type of airlink, which may be the same or different from the airlink supported in another band. The repeater may be configured to determine the airlink for a single channel within each of the multiple bands and apply watermarking to the individual band based on the sensed airlink. Thus, the repeater can be configured to apply watermarking on a per band basis.

In still other embodiments, the operating band of the repeater may be configured to support multiple channel configurations, and the repeater may be configured to examine each channel individually and apply watermarking on an individual channel basis. Still other embodiments can be supported by the repeater, including embodiments that are combinations of the various embodiments discussed above.

An airlink sensing watermarking repeater, system, and method are disclosed. The airlink sensing repeater can determine the type of airlink used in one or more channels of a communication system and configure a watermarking based in part on the airlink. The repeater can omit watermarking for some airlinks. A system can configure the airlink sensing watermarking repeater within a communication system and configure the repeater to relay signals such that a system coverage area is expanded. The repeater can continually or periodically perform airlink sensing and watermark configuration such that watermarking performed by the repeater does not adversely affect the signal.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A wireless repeater comprising:
  a watermarking module to selectively apply or not apply a watermark to at least one channel in a repeater operating band based, at least in part, on a control signal; and a receiver to receive a wireless transmission, to determine a type of an airlink corresponding to at least a portion of the wireless transmission based on demodulating a signal in the portion of the wireless transmission using one of a plurality of demodulation configurations, and to generate the control signal based, at least in part, on the type of the airlink.

2. The repeater of claim 1, wherein the watermark comprises at least one of Frequency Modulation (FM), Phase Modulation (PM), Amplitude Modulation (AM), differential delay modulation, and/or no modulation.

3. The repeater of claim 1, wherein the wireless transmission comprises a forward link transmission from a wireless base station.

4. The repeater of claim 1, wherein the wireless transmission comprises a reverse link transmission.

5. The repeater of claim 1, wherein the portion of the wireless transmission comprises a channel in the repeater operating band.

6. The repeater of claim 1 wherein the portion of the wireless transmission comprises a channel from the at least one channel in the repeater operating band.

7. The repeater of claim 1, wherein the receiver comprises:
a Local Oscillator (LO);
a mixer having an LO port coupled to the LO, the mixer to frequency convert the portion of the wireless transmission to a baseband signal; and
a baseband processor coupled to the mixer; the baseband processor, to determine the airlink based, at least in part on the baseband signal.

8. The repeater of claim 7, wherein the baseband processor is adapted to determine the airlink by demodulating an overhead signal in the baseband signal.

9. The repeater of claim 7, wherein the baseband processor is adapted to determine the airlink by demodulating a pilot channel in the baseband signal.

10. The repeater of claim 7, wherein the baseband processor is adapted to determine the airlink by demodulating a paging channel in the baseband signal.

11. The repeater of claim 7, wherein the baseband processor is adapted to determine the airlink by demodulating a primary scrambling code in the baseband signal.

12. The repeater of claim 1, wherein the receiver is adapted to determine the airlink at least in part by demodulating a pilot channel within the portion of the wireless transmission.

13. The repeater of claim 1, wherein the receiver is adapted to determine the airlink at least in part by demodulating a primary scrambling code within the portion of the wireless transmission.

14. The repeater of claim 1, wherein the type of airlink comprises at least one of a Global System for Mobile communication (GSM) airlink and/or a Code Division Multiple Access (CDMA) airlink.

15. The repeater of claim 1, wherein the airlink comprises at least one of a TIA/EIA IS-95 airlink, a 1x IN DO airlink, and/or a 1x EV-DV airlink.

16. A wireless repeater comprising
a watermarking module to selectively apply a watermark to a forward link channel in a repeater operating band based, at least in part, on a control signal; and
a receiver to receive a plurality of forward link channels including x the forward link channel in the repeater operating band, to determine a type of an airlink corresponding to the forward link channel at least in part by demodulating a pilot channel within the forward link channel, and to generate the control signal to selectively enable or disable the watermarking module based, at least in part, on the determined type of airlink.

17. The repeater of claim 16, the watermarking module to selectively apply the watermark to the forward link channel by applying the watermark to the plurality of forward link channels.

18. The repeater of claim 16, the watermarking module to selectively apply the watermark to the forward link channel independently of any other channel in, the plurality of forward link channels.

19. A method of distributing a wireless communication, the method comprising:
determining a type of an airlink in a channel of an operating band of a repeater;
determining a watermark type based on the type of the airlink and by accessing a list of airlink types and associated acceptable watermark types; and selectively applying or not applying a watermark of the watermark type to the channel based at least in part on the determined type of airlink.

20. The method of claim 19, wherein said, determining the type of the airlink comprises:
receiving the channel over a wireless link; and
demodulating a signal within the channel to determine the type of the airlink.

21. The method of claim 20, wherein said receiving the channel comprises receiving a forward link channel from a base station.

22. The method of claim 20, wherein said receiving the channel comprises receiving a reverse link channel from a user terminal.

23. The method of claim 20, wherein said demodulating the signal comprises demodulating a pilot channel.

24. The method of claim 20, wherein said demodulating the signal comprises demodulating a paging channel.

25. The method of claim 20, wherein said demodulating the signal a comprises demodulating primary scrambling code.

26. The method of claim 19, wherein said selectively applying the watermark to the channel comprises omitting the watermark if the airlink is adversely affected by the watermark.

27. The method of claim 19, wherein said selectively applying the watermark to the channel comprises modulating communications in the channel to identify the repeater.

28. The method of claim 19, wherein said selectively applying the watermark to the channel comprises applying a Frequency Modulation to signals in the channel.

29. The method of claim 19, further comprising wirelessly transmitting a watermarked channel.

30. A method of distributing a wireless communication, the method comprising:
tuning a receiver to a channel within a repeater operating band;
filtering at least one channel including a channel to which the receiver is tuned;
determining a type of an airlink in the channel to which the receiver tuned;
determining if the airlink is affected by a watermark by accessing a list, stored in memory, of airlink types and associated acceptable watermark types; and
selectively applying or not applying a watermark to the channel to which the receiver is tuned, based at least in part on the determined type of airlink.

31. A wireless communication system comprising:
a base station to transmit at least one forward link signal in a forward link channel; and a repeater to receive the at least one forward link channel, to determine a type of an airlink used to transmit the forward link signal, in part, by demodulating a portion of the forward link signal, to selectively apply or not apply a watermark to the forward link channel based at least in part on the determined type of airlink, wherein the watermark comprises applying a modulation from a plurality of modulation types to the forward link channel and to retransmit the forward link signal.

32. A wireless repeater comprising:
means for determining a type of an airlink in a channel of a repeater operating band;
means for determining a watermark type based on the type of the airlink and a list, stored in memory, of airlink types and associated acceptable watermark types, and
means for selectively applying or not applying a watermark of the watermark type to the channel based at least in part on the determined type of airlink.

33. An article, comprising:
a storage medium having stored thereon instructions that, if executed, direct one or more processors to:
determine a type of an airlink in a channel of an operating band of a repeater;
determine a watermark type based on the type of the airlink and a list, stored in memory, of airlink types and associated acceptable watermark types; and
selectively apply or not apply a watermark of the watermark type to the channel based at least in pan on the determined type of airlink.

34. An article, comprising:
a storage medium having stored thereon instructions that, if executed, direct one or more processors to:
tune a receiver to a channel within a repeater operating band;
determine a type of an airlink in the channel to which the receiver is tuned;
determine if the airlink is affected by a watermark based on a list of airlink types and associated acceptable watermark types; and
selectively apply or not apply a watermark to the channel to which the receiver is tuned, based at least in pad on the determined type of airlink.

35. A method of distributing a wireless communication, the method comprising:
receiving a signal over a wireless communication link;
determining an airlink type from a plurality of airlink types by configuring a demodulator to one of a plurality of demodulator configurations and demodulating at least a portion of the signal;
determining a watermark type based on a look up table listing airlinks and appropriate watermark types;
applying a watermark of the watermark type to the signal to generate a watermarked signal; and
wirelessly transmitting the watermarked signal.

* * * * *